United States Patent
Tseng et al.

(10) Patent No.: US 9,040,144 B2
(45) Date of Patent: May 26, 2015

(54) FILTERING FILM STRUCTURE

(75) Inventors: Fan-Gang Tseng, New Taipei (TW);
Yu-Lun Chueh, Hsinchu (TW);
Chia-Jung Chang, Yunlin County (TW);
Wen-Chih Chang, Hsinchu (TW);
Yu-Sheng Huang, Kaohsiung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 63 days.

(21) Appl. No.: 13/603,128

(22) Filed: Sep. 4, 2012

(65) Prior Publication Data

US 2014/0061051 A1   Mar. 6, 2014

(51) Int. Cl.
*B32B 3/24* (2006.01)
*B82Y 30/00* (2011.01)
*B01D 61/46* (2006.01)

(52) U.S. Cl.
CPC .......... *B82Y 30/00* (2013.01); *Y10T 428/24339* (2015.01); *B01D 61/46* (2013.01)

(58) Field of Classification Search
CPC ....................................................... B01D 61/46
USPC .......................................... 428/139; 204/671
See application file for complete search history.

(56) References Cited

U.S. PATENT DOCUMENTS

| 2009/0305138 A1* | 12/2009 | Baca et al. ................. 429/231.8 |
| 2010/0140096 A1* | 6/2010 | Yang et al. .................... 204/672 |
| 2010/0328841 A1* | 12/2010 | Reinhoudt et al. ......... 361/301.4 |
| 2011/0094884 A1 | 4/2011 | Cotte et al. |
| 2011/0168560 A1 | 7/2011 | Afzali-Ardakani et al. |
| 2013/0277222 A1* | 10/2013 | Kwon et al. .................. 204/555 |

FOREIGN PATENT DOCUMENTS

TW   201207162   2/2012

OTHER PUBLICATIONS

Tseng, et al., "Controlling the thickness of the EDL for portable desalination system", The 15th Conference on Nano Engineering and Microsystem Technology, Sep. 6-7, 2011, 5 pages with Abstract.
Chang, et al., "Sea Water Desalination by Manipulating Electrical Double Layer Overlap Inside Electrostaticly Charged AAO Nanochannels", MICROTA, Oct. 2-6, 2011, Seattle, WA., 3 pages.
Tseng, et al., "Controlling the thickness of the EDL of the nanochannels for portable desalination technology", AASRC Conference, Nov. 5, 2011, Taichung, Taiwan, 8 pages with Abstract.

(Continued)

*Primary Examiner* — William P Watkins, III
(74) *Attorney, Agent, or Firm* — Muncy, Geissler, Olds & Lowe, P.C.

(57) ABSTRACT

A filtering film structure includes a film, a conductive layer and a dielectric layer. The film includes a plurality of holes. The conductive layer is disposed on the inner surface of the holes, and the dielectric layer is disposed on the conductive layer. When applying a voltage to the conductive layer, an electrical charge layer forms on the surface of the dielectric layer.

11 Claims, 4 Drawing Sheets

(56) References Cited

OTHER PUBLICATIONS

Huang, et al., "A High Performance Nano Desalination by the Manipulation of EDL among AAO Nanochannels", NEMS, Mar. 5-8, 2012, Kyoto, Japan, 3 pages.

Huang, et al., "Controllable Virtual Nano-Filter for Rapid Water Purification", ISMM, Jun. 10-13, 2012 in Hsinchu, Taiwan, 2 pages.

* cited by examiner

FILTERING FILM STRUCTURE

BACKGROUND OF THE INVENTION

1. Field of Invention

The present invention relates to a filtering film structure and, in particular, to a filtering film structure formed with an electrical double layer (EDL).

2. Related Art

Human body is mostly composed of water (about 70%). Water is very important to human beings and our lives. In general, people can not survive without ingesting water more than 7-10 days. However, water is a limited resource. Although there are five oceans in the world, the seawater can not be directly used as the drinking water. Unfortunately, the drinkable fresh water is so wasted in various ways and is going to be dried someday in the future. In view of this issue, many scientists have devoted to the research of desalination of seawater for developing the way to purify the undrinkable water to drinkable water.

The desalination technique usually utilizes the reverse osmosis (RO) method rather than the old multi-stage flash (MSF) method. However, either the MSF method or the RO method needs a great amount of energy consumption, which is not proper to the environmental protection demand. Thus, it is desired to develop a solution that has lower cost and better efficiency.

SUMMARY OF THE INVENTION

In view of the foregoing, an objective of the present invention is to provide a filtering film structure that has larger unit filtering capacity and lower power consumption.

To achieve the above objective, the present invention discloses a filtering film structure including a film, a conductive layer and a dielectric layer. The film includes a plurality of holes. The conductive layer is disposed on the inner surface of the holes, and the dielectric layer is disposed on the conductive layer. When applying a voltage to the conductive layer, an electrical charge layer forms on the surface of the dielectric layer.

In one embodiment, the material of the film comprises aluminum oxide.

In one embodiment, the material of the conductive layer comprises metal, metal oxide or alloy.

In one embodiment, the metal comprises aluminum, indium, tin, zinc, silver, gold, or platinum.

In one embodiment, the material of the dielectric layer comprises $HfO_2$, $ZrO_2$, $BaTiO_3$, or $Al_2O_3$.

In one embodiment, the thickness of the conductive layer is between 10 nm and 30 nm.

In one embodiment, the thickness of the dielectric layer is between 10 nm and 30 nm.

In one embodiment, the electrical charge layer has a largest thickness of 100 nm.

In one embodiment, the inner diameter of the holes is between 60 nm and 80 nm.

In one embodiment, when applying the voltage to the conductive layer, the inner diameter of the holes is shrunk.

In one embodiment, the applied voltage is between 0.01V and 1V.

As mentioned above, the filtering film structure of the invention has larger unit filtering capacity with higher filtering quality, so that the power consumption for the filtering process can be decreased. This feature can achieve the effects of high quality, high performance and environmental friendly. Compared with the conventional art, the filtering film structure of the invention has a larger unit filtering capacity, which is about 40 times of the commercial family RO machine. Moreover, the filtering film structure of the invention can still keep its filtering quality as the filtering capacity is greatly increased.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

Figure 1A:
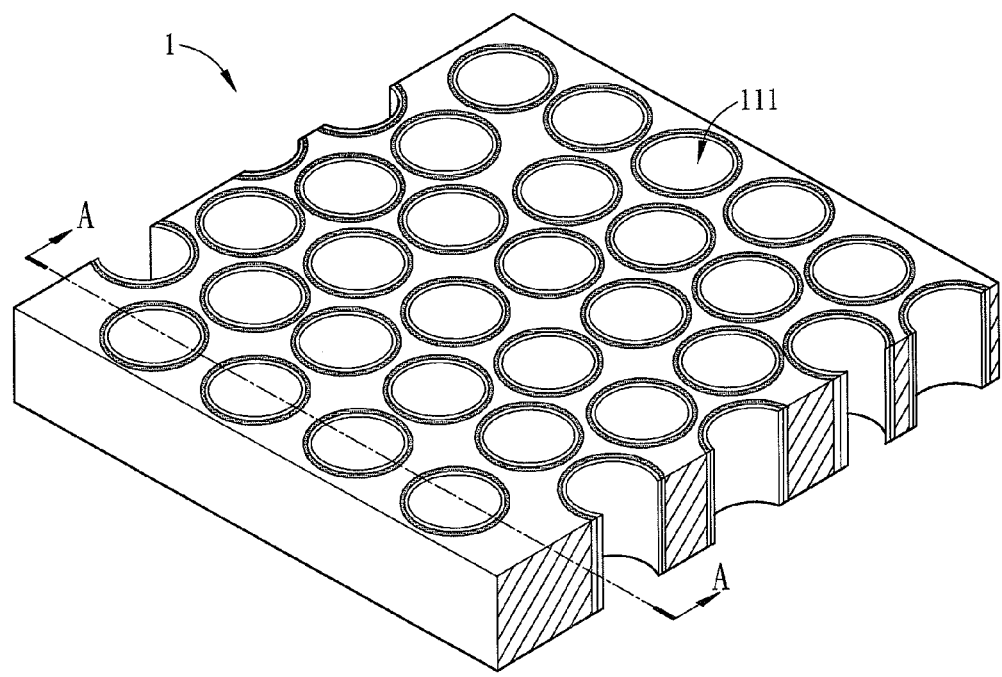
FIG. 1A is a schematic diagram showing a filtering film structure according to an embodiment of the present invention.

The present invention will be apparent from the following detailed description, which proceeds with reference to the accompanying drawings, wherein the same references relate to the same elements.

To be noted, the dimensions and scales of those shown in the drawings are only for illustrations and are not to limit the applications.

Figure 1B:
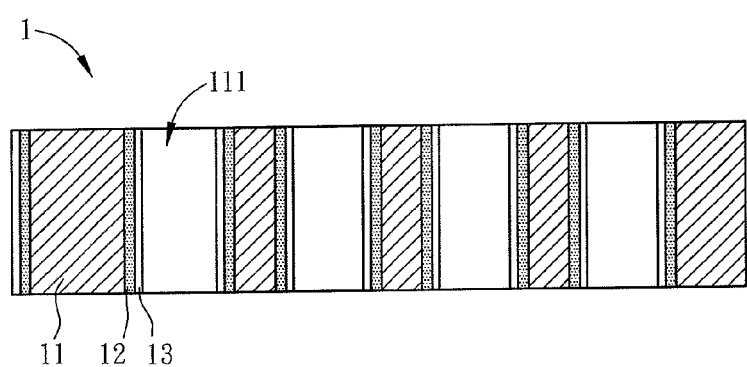
FIG. 1B is an enlarged sectional view of the filtering film structure according to the embodiment of the present invention.

FIG. 1A is a schematic diagram showing a filtering film structure 1 according to an embodiment of the present invention, and FIG. 1B is an enlarged sectional view of the filtering film structure 1 of FIG. 1A along the line AA. Referring to FIGS. 1A and 1B, the filtering film structure 1 includes a film 11, a conductive layer 12 and a dielectric layer 13.

The film 11 has a plurality of holes 111. For example, the material of the film 11 can be an aluminum oxide ($Al_2O_3$) film. In more detailed, the aluminum metal is provided as the anode in acidic solution, and it can be self-assembled to from the aluminum oxide (anodic aluminum oxide, AAO) with nano-level holes, which is suitable for the film 11. The inner diameter of the holes 111 may be different in several tens of nanometers depending on the various conditions of the anode oxidation reaction. When the material of the film 11 is anodic aluminum oxide, the inner diameter of the holes 111 is between 14 nm and 300 nm, and the distribution density of the holes 111 is between 109 and 1012 per square centimeter. In this embodiment, the inner diameter of the holes 111 is between 60 nm and 80 nm. To be noted, in different embodiments, the inner diameter of the holes may be different from the above embodiment and is based on the material of the film 11 or the actual application. For example, the inner diameter of the holes may be between 10 nm and 500 nm.

The conductive layer 12 is disposed on the inner surface of the holes 111 by, for example, physical deposition such as sputtering. The material of the conductive layer 12 comprises any conductive material such as metal, metal oxide, or alloy. In more detailed, the metal includes aluminum (Al), indium (In), tin (Sn), zinc (Zn), silver (Ag), gold (Au), or platinum (Pt). In this embodiment, the conductive layer 12 is made of aluminum, and the thickness of the conductive layer 12 may be different based on the actual requirement. For example, when the inner diameter of the holes 111 is too large, it is possible to deposit a thicker conductive layer 12 for compensation. In this embodiment, the thickness of the conductive layer 12 is between 10 nm and 30 nm. In different embodiments, the thickness of the conductive layer 12 may be different (e.g. between 1 nm and 100 nm) based on the sizes of the holes 111 of the film 11.

The dielectric layer 13 is disposed on the conductive layer 12. For example, the dielectric layer 13 is disposed on the conductive layer 12 by chemical vapor deposition (CVD) such as atomic layer deposition (ALD). The material of the dielectric layer 13 is a dielectric material with high dielectric constant, including $HfO_2$, $ZrO_2$, $BaTiO_3$, or $Al_2O_3$. In this embodiment, the thickness of the dielectric layer 13 is between 10 nm and 30 nm. In different embodiments, the thickness of the dielectric layer 13 may be different (e.g. between 1 nm and 100 nm) based on the sizes of the holes 111 of the film 11.

Figure 2A:
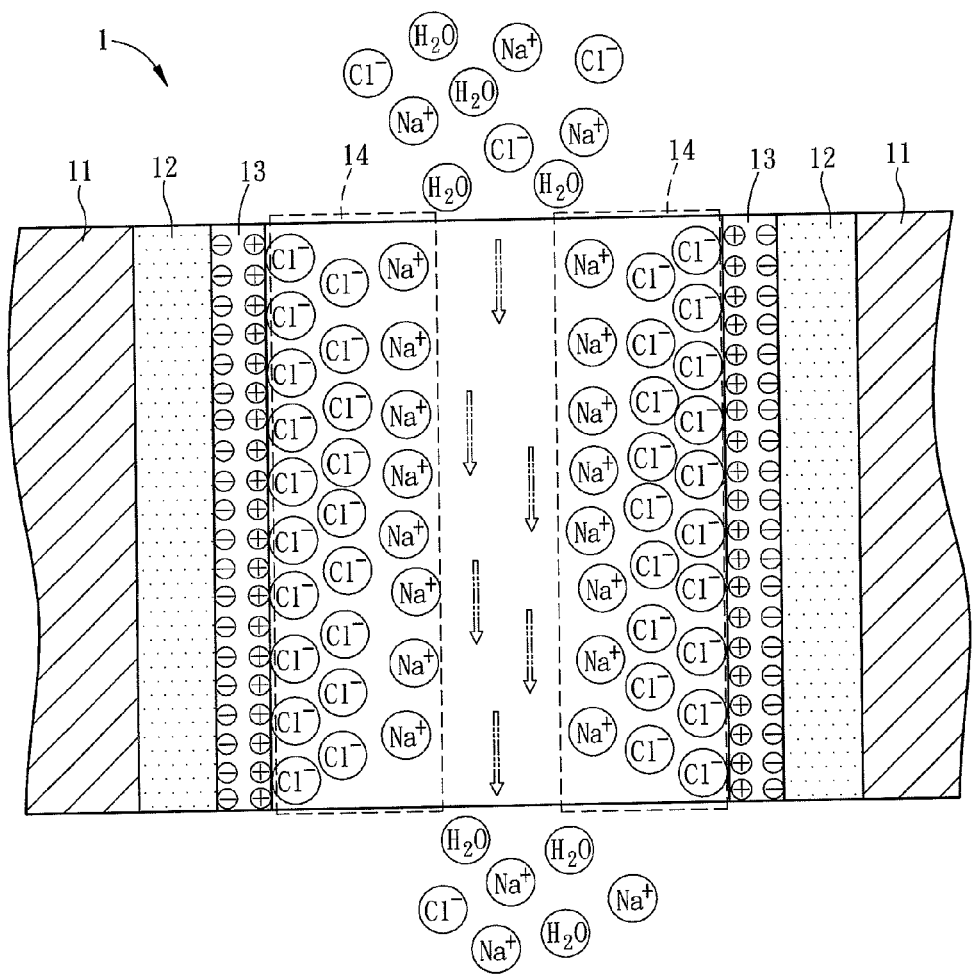
FIG. 2A is a schematic diagram showing a part of the filtering film structure according to the embodiment of the present invention, wherein a positive voltage is applied to the conductive layer.

FIG. 2A is a schematic sectional view of a single hole 111 of the film 11. In the filtering film structure 1, when a voltage is applied to the conductive layer 12 for filtering process, the charges inside the dielectric layer 13 will be polarized by the electric field formed by the conductive layer 12 and then distributed at the surface of the dielectric layer 13. In this embodiment, the dielectric layer 13 is made of $HfO_2$. When the filtering film structure 1 is placed in NaCl solution, sodium ions ($Na^+$), chlorine ions ($Cl^-$) and water molecules ($H_2O$) can freely pass through the holes 111 before applying the voltage to the conductive layer 12. Once the conductive layer 12 is applied with a proper voltage (e.g. a positive voltage), the negative charges inside the dielectric layer 13 are driven by the electric field and then moving to the junction of the conductive layer 12 and the dielectric layer 13, and the positive charges inside the dielectric layer 13 are moving to the surface of the dielectric layer 13 contacting with the NaCl solution. In this case, the chlorine ions ($Cl^-$) in the NaCl solution are attracted by the positive charges at the surface of the dielectric layer 13 and then moving toward the surface of the dielectric layer 13. Then, the sodium ions ($Na^+$) in the NaCl solution are attracted by the chlorine ions ($Cl^-$) distributed on the surface of the dielectric layer 13 and then also moving toward the surface of the dielectric layer 13 so as to form an electrical charge layer 14, which is called an electrical double layer (EDL). Since the positive charges of the dielectric layer 13 are concentrated at the surface in contact with the NaCl solution, the electric charge layer 14 contains more negative chlorine ions ($Cl^-$) and less positive sodium ions ($Na^+$), so that the entire electric charge layer 14 is negative. The formation of the electric charge layer 14 can decrease the inner diameter of the holes 111 of the filter film structure 1. Thus, a part of the sodium ions ($Na^+$) and the chlorine ions ($Cl^-$) in the NaCl solution can not pass through the holes 111, but the residual part of the sodium ions ($Na^+$) and the chlorine ions ($Cl^-$) and water ($H_2O$) can still pass through the holes 111. Since the entire electric charge layer 14 is negative, the amount of the chlorine ions ($Cl^-$) passing through the holes 111 is less than the amount of the sodium ions ($Na^+$) passing through the holes 111. Accordingly, the concentration of the filtered NaCl solution is sufficiently decreased.

Figure 2B:
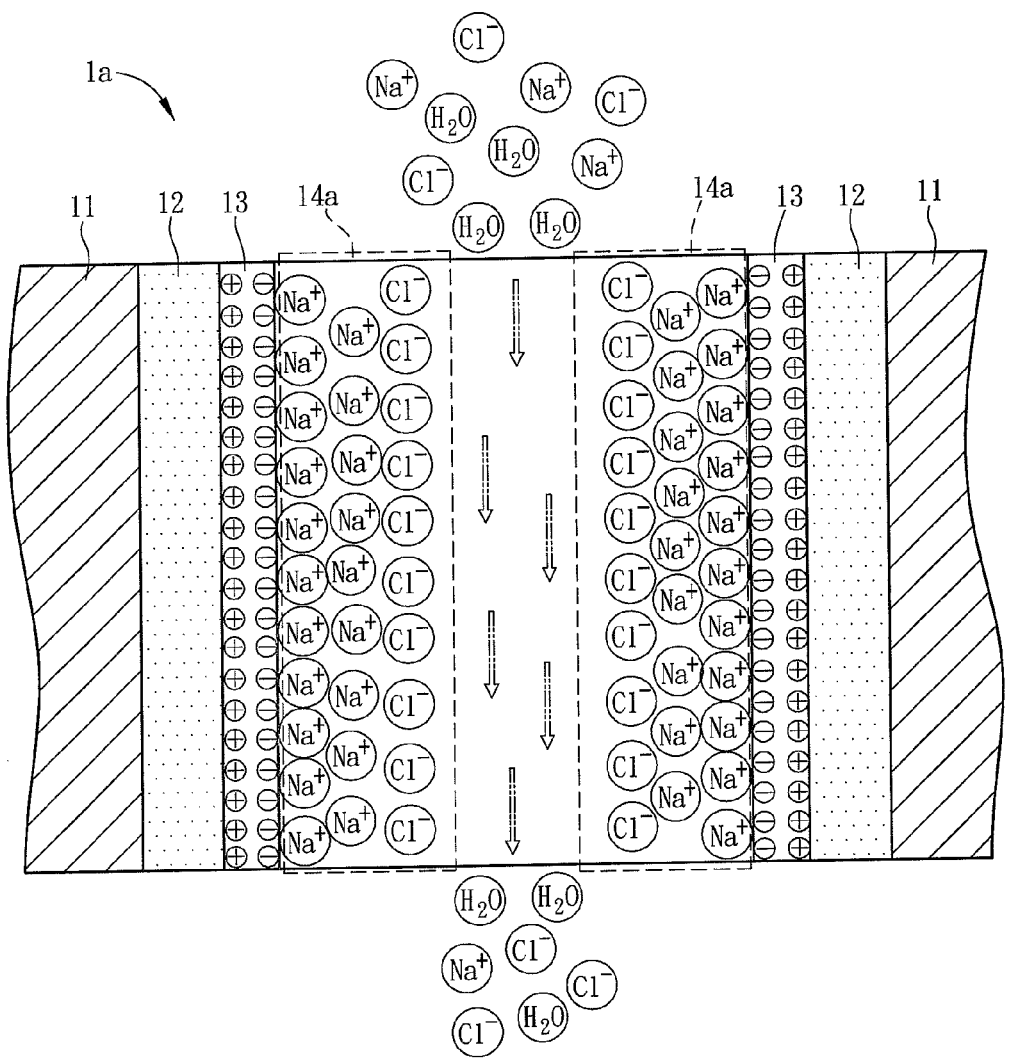
FIG. 2B is a schematic diagram showing a part of the filtering film structure according to the embodiment of the present invention, wherein a negative voltage is applied to the conductive layer.

With reference to FIG. 2B, a filtering film structure 1a is adopted in a filtering process. In this case, the conductive layer 12 is applied with a negative voltage, so that the positive charges inside the dielectric layer 13 are driven by the electric field and then moving to the junction of the conductive layer 12 and the dielectric layer 13, and the negative charges inside the dielectric layer 13 are moving to the surface of the dielectric layer 13 contacting with the NaCl solution. The sodium ions ($Na^+$) in the NaCl solution are attracted by the negative charges at the surface of the dielectric layer 13 and then moving toward the surface of the dielectric layer 13. Then, the chlorine ions ($Cl^-$) in the NaCl solution are attracted by the sodium ions ($Na^+$) distributed on the surface of the dielectric layer 13 and also moving toward the surface of the dielectric layer 13 so as to form an electrical charge layer 14a. Since the negative charges of the dielectric layer 13 are concentrated at the surface in contact with the NaCl solution, the electric charge layer 14a contains less negative chlorine ions ($Cl^-$) and more positive sodium ions ($Na^+$), so that the entire electric charge layer 14 is positive. The formation of the electric charge layer 14a can also decrease the inner diameter of the holes 111 of the filter film structure 1. Thus, a part of the sodium ions ($Na^+$) and the chlorine ions ($Cl^-$) in the NaCl solution can not pass through the holes 111, but the residual part of the sodium ions ($Na^+$) and the chlorine ions ($Cl^-$) and water ($H_2O$) can still pass through the holes 111. Since the entire electric charge layer 14a is positive, the amount of the chlorine ions ($Cl^-$) passing through the holes 111 is more than the amount of the sodium ions ($Na^+$) passing through the holes 111. Accordingly, the concentration of the filtered NaCl solution is sufficiently decreased.

To be noted, the above embodiments applied to NaCl solution are for illustrations only and are not to limit the scope of the invention. In other embodiments, the present invention can be applied to filter other solution such as juice, soy-bean sauce, or the likes. Besides, the formed electrical charge layer may be different for various charged ions in the solution. For various solutions, when applying the voltage to the conductive layer, the surface of the dielectric layer can attract the cations and anions of the solution to form the desired electrical charge layer. In more detailed, when the conductive layer is applied with a positive voltage, the surface of the dielectric layer can attract more anions and less cations so as to form a negative electrical charge layer. On the contrary, when the conductive layer is applied with a negative voltage, the surface of the dielectric layer can attract more cations and less anions so as to form a positive electrical charge layer. In brief, the compositions in the solution that can pass through the filtering film structure are mainly water and ions with the polarity opposite to the electrical charge layer. In other words, when the electrical charge layer is positive, water and anions can pass through the filtering film structure; otherwise, when the electrical charge layer is negative, water and cations can pass through the filtering film structure.

In other embodiments, when the applied voltage is changed, the thickness of the electrical charge layer is correspondingly changed. The variation of the thickness of the electrical charge layer is varied depending on the applied voltage and the material of the dielectric layer 13. The applied voltage is between 0.01V and 100V, and preferably between 0.01V and 1V. The largest thickness of the electrical charge layer can reach 100 nm, or the electrical charge layer can be totally configured with holes 111.

To be noted, although the inner diameter of the holes 111 of the filtering film structure 1 can be decreased as applying the voltage to the conductive layer 12, the unit filtering quantity flowing through the holes 111 is remained the same. In other words, the electrical charge layer 14 is a virtual barrier for prohibiting the charged ions from passing through the holes 111, but it can not stop the uncharged water molecules. Accordingly, the filtering quantity is not reduced as the inner diameter of the holes 111 is decreased. This feature can remain the filtering quality and efficiency.

Figure 3A:
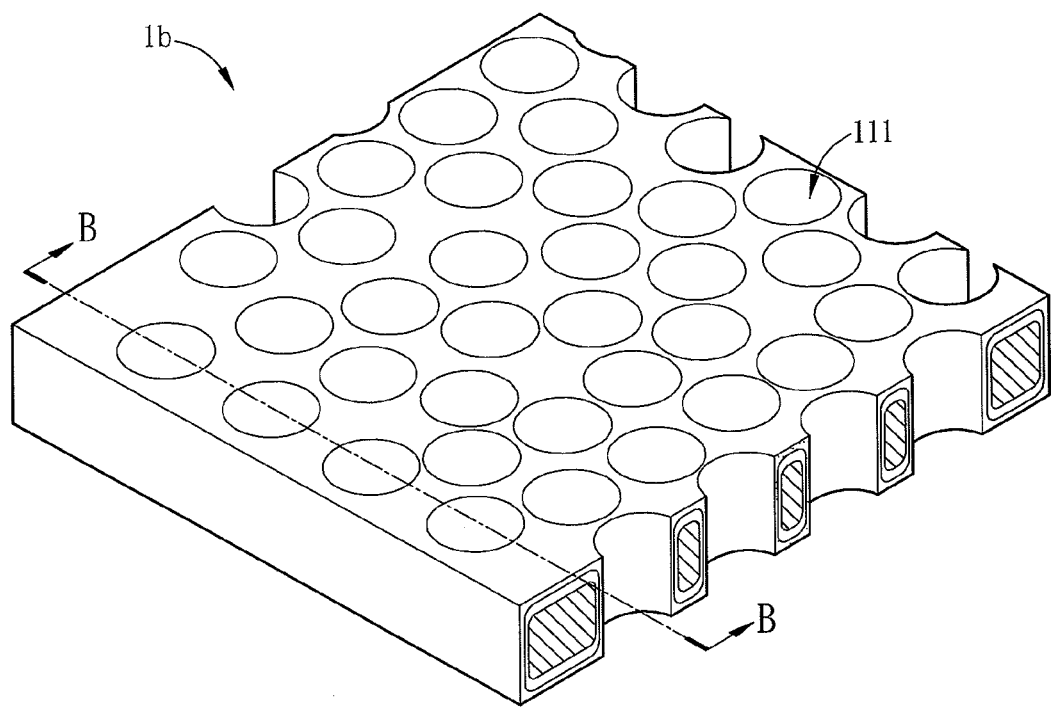
FIG. 3A is a schematic diagram showing a filtering film structure according to another embodiment of the present invention.
Figure 3B:
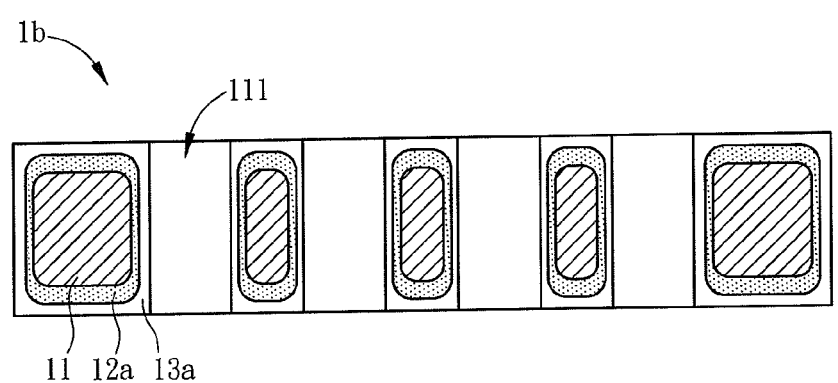
FIG. 3B is an enlarged sectional view of the filtering film structure according to another embodiment of the present invention.

FIG. 3A is a schematic diagram showing a filtering film structure 1b according to another embodiment of the present invention, and FIG. 3B is an enlarged sectional view of the filtering film structure 1b of FIG. 3A along the line BB.

The filtering film structures 1 and 1b are mostly the same and are different only in that the conductive layer 12a is configured on the inner surface of the holes 111 of the film 11 as well as other surfaces of the film 11, such as the top surface and the bottom surface of the film 11. Besides, the dielectric layer 13a is disposed on the outer surface of the conductive layer 12a, so that the electrical charge layer can be formed on all surfaces of the filtering film structure 1b. Since the operation principle of the filtering film structure 1b is the same as that of the filtering film structure 1, the formation of the electrical charge layer can be referred to the above description with reference to FIGS. 2A and 2B, and the detailed descriptions will be omitted.

To be noted, since the inner diameter of the holes of the filtering film structure is in nano-level, the particles in the solution larger than the holes are blocked at one side of the filtering film structure and can not pass through the filtering film structure. In other words, the filtering film structure of the invention can filter the charged ions in the solution by applying the voltage to form the electrical charge layer, and filter the larger particles in the solution by the nano-level holes themselves.

In addition, the solution can pass through the filtering film structure by, for example but not limited to, a passive method or an active method during the filtering process. For example, a passive method is to allow the solution to pass the filtering film structure by diffusion. Otherwise, an active method is to facilitate the filtration by gravity or pump.

In summary, the filtering film structure of the invention has larger unit filtering capacity with higher filtering quality, so that the power consumption for the filtering process can be decreased. This feature can achieve the effects of high quality, high performance and environmental friendly. Compared with the conventional art, the filtering film structure of the invention has a larger unit filtering capacity, which is about 40 times of the commercial family RO machine. Moreover, the filtering film structure of the invention can still keep its filtering quality as the filtering capacity is greatly increased, so it has great potential in the market.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A filtering film structure, comprising:
   a film comprising a plurality of holes;
   a conductive layer disposed on an inner surface of the holes; and
   a dielectric layer disposed on the conductive layer;
   an electrical charge layer formed on the surface of the dielectric layer when a voltage is applied to the conductive layer.

2. The filtering film structure of claim 1, wherein the material of the film comprises aluminum oxide.

3. The filtering film structure of claim 1, wherein the material of the conductive layer comprises metal, metal oxide or alloy.

4. The filtering film structure of claim 3, wherein the metal comprises aluminum, indium, tin, zinc, silver, gold, or platinum.

5. The filtering film structure of claim 1, wherein the material of the dielectric layer comprises $HfO_2$, $ZrO_2$, $BaTiO_3$, or $Al_2O_3$.

6. The filtering film structure of claim 1, wherein the thickness of the conductive layer is between 1 nm and 100 nm.

7. The filtering film structure of claim 1, wherein the thickness of the dielectric layer is between 1 nm and 100 nm.

8. The filtering film structure of claim 1, wherein the electrical charge layer has a largest thickness of 100 nm.

9. The filtering film structure of claim 1, wherein the inner diameter of the holes is between 10 nm and 500 nm.

10. The filtering film structure of claim 1, wherein the inner diameter of the holes is shrunk when the voltage is applied to the conductive layer.

11. The filtering film structure of claim 1, wherein the voltage is between 0.01V and 100V.

* * * * *